United States Patent
Netravali et al.

(10) Patent No.: US 8,182,918 B2
(45) Date of Patent: May 22, 2012

(54) CURED SOY PROTEIN WITH GREEN STRENGTHENING ADDITIVE AND FABRICATION OF SUCH INTO GREEN COMPOSITE

(75) Inventors: Anil N Netravali, Ithaca, NY (US); Xiaosong Huang, Ithaca, NY (US); Preeti Lodha, Maharashtra (IN); Yuzo Yamamoto, Ithaca, NY (US)

(73) Assignee: Cornell Research Foundation, Inc, Ithaca, NY (US)

( * ) Notice: Subject to any disclaimer, the term of this patent is extended or adjusted under 35 U.S.C. 154(b) by 0 days.

(21) Appl. No.: 11/407,329

(22) Filed: Apr. 20, 2006

(65) Prior Publication Data

US 2006/0264135 A1 Nov. 23, 2006

Related U.S. Application Data

(60) Provisional application No. 60/683,294, filed on May 23, 2005, provisional application No. 60/758,543, filed on Jan. 13, 2006.

(51) Int. Cl.
*B32B 5/02* (2006.01)
*B32B 5/16* (2006.01)

(52) U.S. Cl. ......... 428/411.1; 428/497; 428/498; 428/499; 524/1; 524/17; 524/25

(58) Field of Classification Search ............ 428/411.1, 428/497, 498, 499; 524/1, 17, 25
See application file for complete search history.

(56) References Cited

U.S. PATENT DOCUMENTS

| | | | |
|---|---|---|---|
| 5,523,293 A * | 6/1996 | Jane et al. | 514/21 |
| 5,635,123 A | 6/1997 | Riebel et al. | |
| 5,665,152 A | 9/1997 | Bassi et al. | |
| 5,710,190 A | 1/1998 | Jane et al. | 521/102 |
| 5,922,379 A | 7/1999 | Wang | |
| 6,083,582 A * | 7/2000 | Chen et al. | 428/34.8 |
| 6,306,997 B1 * | 10/2001 | Kuo et al. | 527/100 |
| 6,337,097 B1 | 1/2002 | Sun et al. | |
| 6,497,760 B2 | 12/2002 | Sun et al. | |
| 6,518,387 B2 | 2/2003 | Kuo et al. | |
| 6,528,571 B1 * | 3/2003 | Erhan et al. | 524/494 |
| 6,632,925 B1 | 10/2003 | Zhang et al. | |
| 6,790,271 B2 | 9/2004 | Thames et al. | |
| 6,806,353 B2 | 10/2004 | Zhang et al. | |

(Continued)

FOREIGN PATENT DOCUMENTS
WO WO 00/06650 2/2000

OTHER PUBLICATIONS

Lodha et al., "Characterization of interfacial and mechanical properties of 'green' composites with soy isolate and ramie fiber", Journal of Materials Science, 37, 2002, 3657-3665.*

(Continued)

*Primary Examiner* — Matthew Matzek
(74) *Attorney, Agent, or Firm* — Jaeckle Fleischmann & Mugel, LLP

(57) ABSTRACT

Strengthened soy protein based biodegradable composition comprises plasticized or unplasticized cured soy protein strengthened with green strengthening agent. Green strengthening agents include nanoclay, microfibrillated cellulose, nanofibrillated cellulose, cured green polysaccharide and green fibers, filaments, yarns, and fabrics and combinations of these. These can be fabricated into composites.

9 Claims, 4 Drawing Sheets

U.S. PATENT DOCUMENTS

| | | | |
|---|---|---|---|
| 6,821,331 | B2 | 11/2004 | Damodaran |
| 6,987,138 | B2 | 1/2006 | Tokiwa et al. |
| 7,060,798 | B2 | 6/2006 | Li et al. |
| 7,081,159 | B2 | 7/2006 | Thames et al. |
| 2003/0078323 | A1* | 4/2003 | Zhang et al. ............ 524/17 |
| 2003/0148084 | A1 | 8/2003 | Trocino, Sr. |
| 2004/0089418 | A1 | 5/2004 | Li |
| 2004/0249065 | A1 | 12/2004 | Schilling et al. |
| 2005/0166796 | A1 | 8/2005 | Sun et al. |
| 2005/0222358 | A1 | 10/2005 | Wescott et al. |
| 2005/0261404 | A1 | 11/2005 | Rivers et al. |
| 2005/0272892 | A1 | 12/2005 | Hse et al. |
| 2006/0043629 | A1* | 3/2006 | Drzal et al. ............ 264/140 |
| 2006/0094800 | A1 | 5/2006 | Jong |
| 2006/0194010 | A1 | 8/2006 | Hiscock |
| 2006/0234077 | A1 | 10/2006 | Breyer et al. |

OTHER PUBLICATIONS

Google searches dated Mar. 23, 2012.*

Preeti Loda, Anil N. Netravali, "Thermal and mechanical properties of environment-friendly 'green' plastics from stearic acid modified-soy protein isolate;" Industrial Crops and Products, an international journal 21 (2005) 49-64, Elsevier.

Preeti Loda, Anil N. Netravali, "Characterization of stearic acid modified soy protein isolate resin and ramie fiber reinforced 'green' composites:" Composites Science and Technology 65 (2005) 1121-1225, Elsevier.

Preedi Loda, Anil N. Netravali, "Effect of soy protein isolate resin modifications on their biodegradation in a compost medium," Polymer Degradation and Stability 87 (2005) 465-477, Elsevier; available online Dec. 8, 2004.

Xiaosong Huang and Anil N. Netravali, "Characterization of Nano-Clay Reinforced Phytagel-Modified Soy Protein Concentrate Resin," 2006, Biomacromolecules, 7, 2783-2789.

Xiaosong Huang, Anil Netravali, "Characterization of flax fiber reinforced soy protein resin based green composites modified with nanoclay particles," Composites Science and Technology 67 (2007) 2005-2014, Elsevier.

C. H. Schilling, T. Babcock, S. Wang and J. Jane "Mechanical properties of biodegrable soy-protein plastics," J. Mater Res., vol. 10, No. 9 Sep. 1995, 2197-2202, 1995 Materails Research Societ.

S. Wang, H.J. Sue, J. Jane, "Effects of Polyhydric Alcohols on the Mechanical Properties of Soy Protein Plastics," J.M.S.—Pure Appl. Chem., A33(5) 557-569 (1996); Marcel Dekker, Inc.

Y. Yamamoto, D. Zahora and A. N. Netravali, "Determination of the interfacial properties between modified soy protein resin and kenaf fiber," Composite Interfaces vol. 14, No. 7-9, 669-713 (2007) VSP.

Anil N. Netravali, Xiaosong Huang and Kazuhiro Mizuta, "Advanced 'green' composites" Adv. Composite Mater, vol. 16. No. 4, pp. 269-282 (2007) copyright VSP 2007; available online www.brill.nl/acm.

Lodha, P. and Netravali, A.N., "Characterization of Interfacial and Mechanical Properties of "Green" Composites With Soy Protein Isolate and Ramie Fiber", Journal of Materials Science 37 (17), 3657-3665, Sep. 2002.

Netravali, A.N., ""Green" Composites from Cellulose Fabrics & Soy Protein Resin", National Textile Center Research Briefs—Fabrication Competency, Jun. 2003.

Netravali, A.N. and Chabba, S., "Composites Get Greener", Materials Today, 22-29, Apr. 2003.

Netravali, A.N., "F01-CR01 "Green" Composites From Cellulose Fabrics and Soy Protein Resin", National Textile Center Annual Report, 1-10, Nov. 2004.

Chabba, S., et al., ""Green" Composites Using Cross-Linked Soy Flour and Flax Yarns", Green Chem., 7, 1-6 (2005).

Netravali, A.N., "Environment-Friendly, Fully Sustainable "Green" Composites: Current Trends and Developments", Fiber Science Program, Cornell University, Cost Action 628 Conference, Tampere, Finland, NY, 1-26, Sep. 1-2, 2005.

Chabba, S. and Netravali, A.N., ""Green" Composites Part 1: Characterization of Flax Fabric and Glutaraldehyde Modified Soy Protein Concentrate Composites", Journal of Materials Science, published online Sep. 8, 2005.

Chabba, S. and Netravali, A.N., ""Green" Composites Part 2: Characterization of Flax Yarn and Glutaraldehyde/Poly(vinyl alcohol) Modified Soy Protein Concentrate Composites", Journal of Materials Science, published online Sep. 8, 2005.

Lodha, P. and Netravali, A.N., "Characterization of Phytagel® Modified Soy Protein Isolate Resin and Unidirectional Flax Yarn Reinforced "Green" Composites", Polymer Composites, 647-659, 2005. SAMPE '06, Technical Program and Exhibitors Guide Apr. 30-May 4, 2006, Long Beach, CA, p. 18.

Lodha, P., et al., "Soy Protein Polymer (SPP) Based Flax and Clay Reinforced Composites", Cornell University Center of Materials Research Poster, prior to May 23, 2004.

Luo et al., Journal of material Science, vol. 34, pp. 3709-3719 (1999).

Zhong et al., Journal of Polymers and the Environment, vol. 11. No. 4, pp. 137-144 (Oct. 2003).

Kumar et al., Industrial Crops and Products, vol. 16, pp. 155-172 (2002).

Lodha et al., poster entitled, "Soy Protein Polymer (SPP) Based Flax and Clay Reinforced Composites." National Textile Center Conference, (Jun. 23, 2004).

* cited by examiner

CURED SOY PROTEIN WITH GREEN STRENGTHENING ADDITIVE AND FABRICATION OF SUCH INTO GREEN COMPOSITE

CROSS-REFERENCE TO RELATED APPLICATIONS

This application claims the benefit of U.S. Provisional Patent Application No. 60/683,294, filed May 23, 2005, and of U.S. Provisional Patent Application No. 60/758,543, filed Jan. 13, 2006.

TECHNICAL FIELD

This invention is directed to a biodegradable resin comprising cured soy protein and strengthening additive, and fabrication of composites containing the resin and green fiber, filament, yarn, woven fabric and/or non-woven fabric containing green polymer which is different from cured soy protein.

BACKGROUND OF THE INVENTION

Fiber reinforced composites made using fibers, e.g., glass, graphite, aramid, etc., and resins, e.g. epoxies, polyimides, vinylesters, nylons, polypropylene, etc. are used in multitude of applications ranging from aerospace to automobile components and from sports gear to electronic circuit boards. Most commercially available composites used today are made using petroleum based fibers and resins. These composites do not degrade under normal environmental conditions for several decades and pose a threat to the environment. In addition, since composites are made using two dissimilar materials, they cannot be easily recycled or reused. This is particularly true for thermoset resins. As a result, at the end of their life, most composites end up in land-fills. With applications multiplying in the past few years and expected to increase further, composite waste disposal is a serious concern. In addition, petroleum has become expensive and so are fibers, resins and composites based thereon.

SUMMARY OF THE INVENTION

The invention herein uses soy protein as a base material to prepare green resins that have been modified to improve their mechanical properties while maintaining their green property. Thus, contrary to most commercially available resins, they do not rely on petroleum for base material and do not pose a threat to the environment.

The invention also is directed to fabrication of these green resins into green composites with fibers, filaments, yarns, woven fabrics and/or non-woven fabrics constituted of green polymer different from cured soy protein, including natural, regenerated or synthesized green polymers.

The term "biodegradable" is used herein to mean degradable over time by water and/or enzymes found in nature, without harming the environment.

The terms "green resin" and "green composite" are used herein to mean that the resin and composite are sustainable and at the end of their useful life, can be disposed of or composted without harming the environment.

The terms "green strengthening agent" and "green polymer" and "green fibers, filament, yarn, woven and/or non-woven" are used herein to mean that these can be included to form green resin and green composite.

One embodiment herein, denoted the first embodiment, is directed to biodegradable composition (biodegradable resin) comprising from 99.5% to 40% by weight plasticized or unplasticized cured soy protein (uncured soy protein plus uncured green strengthening agent basis) and from 0.5% to 60% by weight (uncured soy protein plus uncured green strengthening agent basis) of one or more green strengthening agents, said composition having a stress at maximum load of at least 12.3 MPa and modulus of at least 150 MPa. In a variation, strengthening agent is defined, and mechanical properties are therefore inherent.

The green strengthening agents include, for example, nanoclay, microfibrillated cellulose, nanofibrillated cellulose, cured green polysaccharide, green reinforcing fibers, filaments, yarns, parallel arrays thereof, woven fabric, knitted fabric and/or non-woven fabric of green polymer different from cured soy protein, and combinations of these, and preferably comprise cured green polysaccharide.

Plasticizing of the cured soy protein increases fracture strain and toughness.

Another embodiment herein, denoted the second embodiment, is directed to a method for preparing a biodegradable composite sheet or sheet stack comprising the steps of blending precured soy protein and from 2 to 60% by weight green short fibers (uncured soy protein plus green short fibers basis) of constitution different from soy protein and forming a sheet or stack of sheets with the green short fibers randomly oriented therein, and curing the sheet or stack of sheets.

Another embodiment herein, denoted the third embodiment, is directed to a method for preparing a biodegradable composite sheet comprising the steps of dispensing aligned rows of green short fibers onto an uncured soy protein sheet in an amount ranging from 2 to 60%, e.g., 5 to 40%, by weight (uncured soy protein plus green short fibers basis) to form uncured soy protein sheet with aligned unidirectional green short fiber rows thereon and/or therein, then precuring, followed by curing. As used herein, the term "unidirectional" means all fibers being parallel and oriented in one direction.

Another embodiment herein, denoted the fourth embodiment, is directed to a method for preparing a composite comprising green fiber, filament or yarn or parallel array thereof or green woven fabric, green knitted fabric or green non-woven fabric impregnated with cured soy protein polymer, comprising one or more steps of dipping the fiber, filament or yarn, individually, or in parallel array, or fabric into a bath of uncured soy protein with or without green strengthening agent therein, where when green strengthening agent is present, said bath comprises from 99.5 to 40% by weight uncured soy protein (including water content ranging from 500 to 1500%) by weight and from 0.5 to 60% by weight green strengthening agent (uncured soy protein plus green strengthening agent basis), to obtain bath composition coated/impregnated fiber, filament, yarn or parallel array thereof, or fabric, with a coating amount so as to provide a cured coating amount in the product composite ranging from 30 to 65% of the total weight of the product composite, drying to obtain precuring, then hot pressing to obtain curing.

As used herein, the term "stress at maximum load" means the stress at load just prior to fracture as determined by the stress-strain curve in a tensile test.

As used herein, the term "fracture stress" means the stress at fracture as determined by the stress-strain curve in a tensile test.

As used herein, the term "fracture strain" means the strain (displacement) at fracture as determined by the stress-strain curve in a tensile test.

As used herein, the term "modulus" means stiffness as determined by the initial slope of the stress-strain curve in a tensile test.

As used herein, the term "toughness" means the amount of energy used in fracturing the material as determined by the area under the stress-strain curve.

The tensile test referred to is carried out using Instron or similar testing device according to the procedure of ASTM Test No. D882 for resin sheets and D3039 for composites.

The term "short fibers" is used herein to mean fibers having a length in the range of 5 mm to 5 cm.

The term "uncured soy protein" is used herein to mean soy protein that has not been precured or precured and cured as defined below; the term includes moisture content that is present.

The term "precured" is used herein to mean exposing to heat for a time sufficient to obtain a homogeneous admixture, without the occurrence of crosslinking.

The term "cure" or "curing", without a modifier, is used herein to mean cause crosslinking.

DETAILED DESCRIPTION

Figure 1:
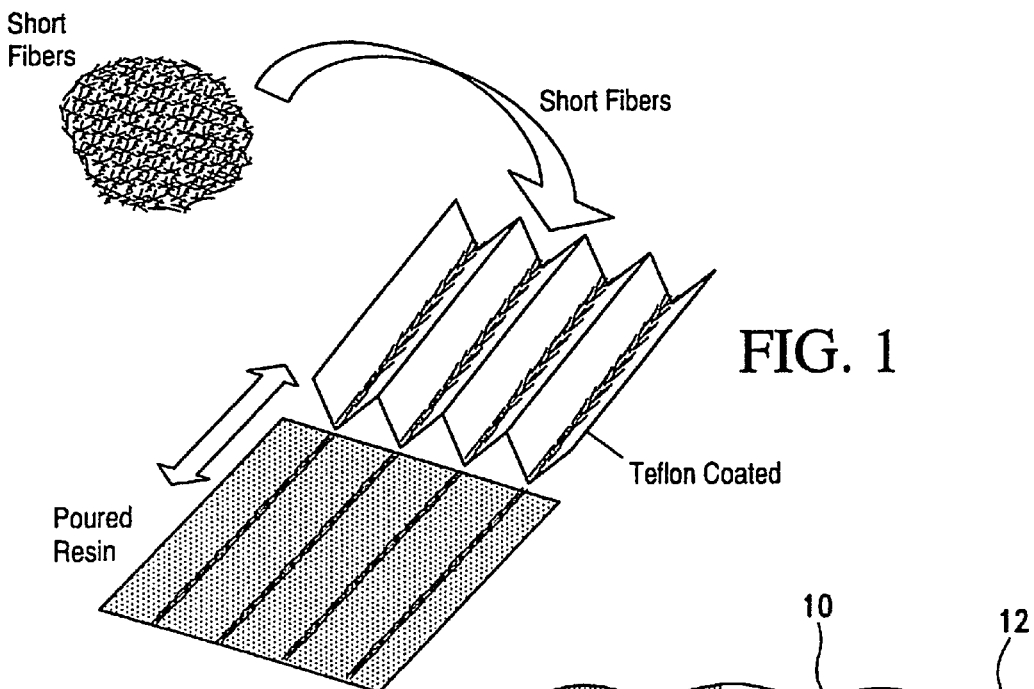
FIG. 1 is a schematic diagram showing a technique for fabrication of unidirectional short fiber composites according to the present invention.

We turn now to the first embodiment.

The soy protein used to form the composition (resin) of the first embodiment, is commercially available in three different varieties: soy protein isolate (SPI), soy protein concentrate (SPC) and soy flour (SF). Their approximate compositions are given in Table 1, below.

TABLE 1

Typical chemical compositions of commercially available soy proteins

| Component | Protein | Fat | Fiber | Ash | Carbohydrates |
|---|---|---|---|---|---|
| Soy flours (%) | 56.0 | 1.0 | 3.5 | 6.0 | 33.5 |
| Soy protein concentrates (%) | 72.0 | 1.0 | 4.5 | 5.0 | 17.5 |
| Soy protein isolates (%) | 96.0 | 0.1 | 0.1 | 3.5 | 0.3 |

All these have moisture contents ranging from 4 to 6% by weight.

SPC powder, ARCON®S obtained from Archer Daniel Midland Company, Decatur, Ill., was used in experimentation herein.

Soy protein contains 18 different amino acid monomers including those containing acidic groups (glutamic acid, aspartic acid, cystine, etc.) and those containing basic groups (lysine, arginine, etc.). Some contain neutral groups (glycine, alanine, leucine, isoleucine, etc.). When treated to cause crosslinking, the main crosslinks are disulfide crosslinks between cystine amino acids present in the soy protein.

Plasticizing of the soy protein reduces the brittleness (increase fracture strain and increase toughness) of unplasticized crosslinked soy protein. Very preferably, the plasticizing is with 0.5 to 35% by weight glycerol, based on the weight of the soy protein.

In all cases of preparing compositions of the first embodiment, the soy protein, in powder form, e.g., 1 to 5 microns, e.g., SPC powder, can be initially admixed with distilled and/or deionized or other good quality water in a weight ratio ranging, for example, from 1:5 to 1:15. If the soy protein is to be plasticized, the plasticizer, preferably glycerol, is admixed. The solution pH can be any except for the isoelectric point of the soy protein, i.e., 4.5 pH, since the soy protein is not water soluble at its isoelectric point. The admixture is pre-cured, with strengthening additive being added prior to or during pre-curing. The pre-cured admixture is cured for applications as described below.

Microfibrillated cellulose strengthening agent, nanofibrillated cellulose strengthening agent and green polysaccharide strengthening agent are preferably admixed prior to precuring. Nanoclay strengthening agent is preferably added during precuring. Fibers, filaments, yarns, fabrics are admixed during formation/fabrication of composites; after precured resin is impregnated, the composites are cured as described below.

The precuring can be carried out by maintaining homogenized admixture of uncured soy protein, with or without plasticizer and green strengthening agent, at 75° C. to 90° C. for 30 minutes, in a water bath (which provides the temperature). For each increase of 10° C. in temperature of the pre-curing bath, time of precuring is reduced by half. For each decrease of 10° C. in temperature in the precuring bath, time of precuring is increased by half. Precuring is complete when a homogeneous admixture is obtained without crosslinking occurring.

The precured admixture is cured, i.e., crosslinking is effected in the soy protein, and in polysaccharide if present, by drying the pre-cured admixture at 35° C. for 24 hours followed by hot pressing under a pressure of about 8 MPa at 120° C. for 25 minutes. Curing can also be carried out at a temperature between 110° C. and 140° C. and adjusting the time (reducing time by half for each 10° C. increase and increasing the time by half for each 10° C. decrease or as needed). Curing can also be accomplished by starting at around 70° C. and raising in several steps to the final curing temperature and removing pressure between steps to allow stream/vapor to escape. The pressure can also be increased or decreased and can range, for example, from 4 MPa to 20 MPa. Curing is completed when less than 20% moisture remains.

The curing/crosslinking increases the stiffness of the material.

We turn now to the case of the first embodiment where the strengthening agent is nanoclay, e.g., having a dry particle size of 90% less than 15 microns.

As used herein, the term "nanoclay" means clay having nanometer thickness silicate platelets. The nanoclay is preferably montmorillonite, a natural clay. Other useful nanoclays include, for example, fluorohectorite, laponite, bentonites, beidellites, hectorites, saponites, nontronites, sauconites, vermiculites, ledikites, nagadiites, kenyaites and stevensites.

The nanoclay used for experimentation herein was Cloisite® Na$^+$ obtained from Southern Clay Products, Inc., Texas. It is described as a natural montmorillonite and has a dry particle size of 90% less than 13 microns.

In preparing the biodegradable composition of the first embodiment where the strengthening agent is nanoclay, the nanoclay is suspended in water, exfoliated and purified. This is readily carried out by dispersing nanoclay particles in water, preferably distilled water, then stirring to cause suspension and exfoliation, then removing the larger (non-exfoliated) agglomerates.

Soy protein in powder form, e.g., SPC powder, is admixed with water and optionally pH adjuster and optionally plasticizer as described above, and after homogenizing, precuring is initiated. After at least fifteen minutes of precuring, nanoclay suspension is added and precuring is continued for five to twenty minutes more. Curing is then carried out as described above. The nanoclay does not take part in the reaction but is rather present as reinforcing additive and filler. The composition can be characterized as green since the nanoclay particles are natural and simply become soil particles if disposed of or composted.

We turn now to the case where the sole strengthening agent is microfibrillated cellulose (MFC) or nanofibrillated cellulose (NFC). Up to 60% MFC or NFC by weight (uncured soy protein plus green strengthening agent basis) can improve the mechanical properties of the composition without these, significantly. The MFC/NFC are available in the form of a slurry in water which is readily blended with soy protein (e.g., SPC) powder/water/any plasticizer prior to precuring. Precuring and curing are then carried out as described above.

MFC is sold commercially by Daicel Chemical Industries, Japan. MFC is manufactured by separating (shearing) the cellulose fibrils from several different plant varieties. Further purification and shearing, produces nanofibrillated cellulose. The only difference between MFC and NFC is size (micrometer versus nanometer). The MFC and NFC do not take part in any reaction but are rather present as strengthening additives or filler. However they are essentially uniformly dispersed in the biodegradable composition and because of their size and aspect ratio, act as reinforcement. The compositions are green because the MFC and NFC degrade in compost medium and in moist environments through microbial activity.

We turn now to the case where the only strengthening agent is cured green polysaccharide.

In this case the biodegradable composition comprises from 98 to 40% by weight (uncured soy protein plus uncured green polysaccharide basis) array of plasticized or unplasticized cured soy protein, from 2 to 60% (uncured soy protein plus uncured green polysaccharide basis) array of cured green polysaccharide.

The arrays form an intermingling and interacting (e.g., being bonded to each other at least by hydrogen bonding due to polar groups in the cured array) network.

Because of the cured green polysaccharide strengthening agent, the mechanical properties are inherently provided and are, for example, a fracture stress of at least 15 MPa and a modulus of at least 500 MPa.

The term "array" is used herein to mean a network structure.

The term "intermingling" is used herein to mean network structures that penetrate each other. The term "interacting" is used herein to mean having at least hydrogen bonding between two arrays.

The green polysaccharide is preferably agar. Other useful green polysaccharides include, for example, gellan gum (Phytagel™), carrageenan and the like.

The composition of the first embodiment where the strengthening agent is only crosslinked agar can be prepared as follows: Soy protein powder, e.g., 1 to 5 microns, e.g., SPC powder, is suspended in water (e.g., distilled and deionized water) as described above. Plasticizer, e.g., glycerol, is optionally added. Agar is dissolved in water, e.g., distilled and deionized water in a water bath kept at 90° C. for thirty minutes. The soy protein powder suspension and agar solution are admixed. Precuring and curing are then carried out in accordance with the general conditions described above. Based on its chemistry, cured agar is fully degradable.

The composition of the first embodiment where the strengthening agent is only gellan gum is now described. Gellan gum is commercially available as Phytagel™ from Signa-Aldrich Biotechnology. It is produced by bacterial fermentation and is composed of glucuronic acid, rhanmose and glucose. It is commonly used as a gelling agent for electrophoresis. Based on its chemistry, cured Phytagel™ is fully degradable. The composition of the first embodiment where cured gellan gum is the sole strengthening agent is readily prepared as follows. Phytagel™ is dissolved into distilled water to form a solution or weak gel (depending on the concentration). The solution or gel is added to the initial soy protein powder suspension (with or without plasticizer, e.g., glycerol therein). Precuring and curing are then carried out in accordance with the general conditions described above.

During curing, crosslinking occurs in both soy protein and in polysaccharide, individually to form array(s) of cured soy protein and array(s) of cured polysaccharide. Intermingling occurs because the two arrays are mixed together. Hydrogen bonding occurs between the formed arrays of cured soy protein and cured polysaccharide because both arrays (systems) contain polar groups such as —OH, —COOH or —NH$_2$.

We turn now to the composition of the first embodiment containing more than one kind of strengthening agent.

In one case, the composition of the first embodiment comprises from 98 to 40% by weight (uncured soy protein plus uncured green strengthening agent basis) plasticized or unplasticized cured soy protein and from 2 to 60% by weight of green strengthening agent (uncured soy protein plus green strengthening agent basis) where the green strengthening agent consists of from 1 to 59% by weight cured green polysaccharide (uncured soy protein plus nanoclay plus uncured green polysaccharide basis) and from 1 to 15% by weight nanoclay (uncured soy protein plus uncured polysaccharide plus nanoclay basis).

Processing is carried out the same as where agar or Phytagel® or other green polysaccharide is the only strengthening agent but nanoclay suspension is added toward the end of the precuring step.

In another case, the composition of the first embodiment comprises from 98 to 40% by weight (uncured soy protein plus uncured green strengthening agent basis) plasticized or unplasticized cured soy protein and from 2 to 60% by weight of green strengthening agent (uncured soy protein plus green strengthening agent basis) where the green strengthening agent comprises from 1 to 59% by weight cured green polysaccharide (uncured soy protein plus uncured green polysaccharide plus MFC or NFC basis) and from 1 to 59% by weight microfibrillated or nanofibrillated cellulose (uncured soy protein plus uncured polysaccharide plus MFC or NFC basis).

Processing is carried out the same where agar or Phytagel™ or other green polysaccharide is the only strengthening agent but MFC/NFC suspension is added into the soy protein and polysaccharide in water composition to be precured.

We turn now the second embodiment herein. The green short fibers can be, for example, plant based fibers, protein fibers, or regenerated varieties. The plant based fibers and regenerated varieties thereof include cellulosics including regenerated cellulose, e.g., viscose rayon and lyocell. The protein fibers include natural fibers such as silk and those from feathers from a variety of fowl including turkey and chicken, hair, and regenerated varieties (spider silk). The method of the second embodiment comprises the steps of blending soy protein or soy protein and strengthening agent composition that is being precured (under the conditions previously set forth) with from 2% to 60% by weight of green short fibers (that is 2 to 60% of uncured soy protein plus strengthening agent plus green short fibers), completing precuring, thereby obtaining a homogeneous admixture, with short fibers of random orientation therein, then positioning the precured admixture onto a non-stick surface (e.g., a Teflon® or aluminum surface), then curing one precured sheet or a stack of precured sheets, e.g., oriented in the same or different direction, to form a green composite sheet or stack of sheets. The precuring and curing are carried out under the conditions set forth above.

We turn now to the third embodiment herein. The dispensing can be by means of an inclined pleated non-stick surface plate where the fibers are added onto each pleat of the inclined pleated plate and aligned in one direction within each pleat and shaking or vibrating the pleated plate to dispense unidirectional rows of fibers onto uncured sheet of soy protein optionally together with strengthening agent and the combination is exposed to precuring and curing conditions as described above to form a composite with unidirectional rows of fibers thereon. Precured composite sheets can be stacked with the rows of fibers in a sheet in the same or a different direction from a second sheet, before curing.

We turn now to the fourth embodiment herein. The coating or impregnation is in an amount ranging from 30 to 120% by weight of the substrate (up to 60% by weight of the cured composite). The coated/impregnated workpiece is dried, e.g., by use of heated rolls, to obtain precuring. The precured composite, optionally cut to desired size and shape (known as a prepreg), can be cured by hot pressing. To obtain thicker composite sheets, a plurality of sheets can be stacked for curing. The sheets can be stacked with unidirectional fibers and yarns at different angles in different layers.

In the cases of the second embodiment and the third embodiment, one or more green hydrophobic sheets (e.g., of polylactic acid or polyhydroxybutyrate), can be placed into contact within one or more precured sheets as described above prior to curing.

The biodegradable compositions (resins) herein are useful for combination with green reinforcing materials to form composites. These composites and the composites described above, are useful, for example, for product casing and packaging, indoor panels and structural applications in transportation and housing markets, circuit boards and other electronic items and mass-volume disposable consumer goods. At the end of its useful life, the composite can be disposed of or composted without harming the environment.

The invention is illustrated by the following working examples.

BIODEGRADABLE COMPOSITION PREPARATION EXAMPLE 1

SPC Plus Nanoclay

Cloisite® Na+ was obtained from Southern Clay Products, Inc., Texas. The particles were dispersed into distilled water using an ultrasonic and magnetic stirrer to form a clay suspension. This caused exfoliation of the particles. A one-week stabilization process was followed in order to remove the larger (non-exfoliated) Cloisite® Na+ agglomerates in the suspension. The resulting purified yellowish clay suspension was stable and no further phase separation was seen within a month under unperturbed condition. This suspension was ready to be used for the nanoclay modified SPC and other resins directly.

SPC powder was initially mixed with distilled and dionized water in a weight ratio of 1:15. Glycerol was added as a plasticizer at a level of 30% based on the weight of the SPC. The pH was adjusted to 7.9 using 1N sodium hydroxide solution in water. Homogenizing was then carried out with a magnetic stirrer for thirty minutes. The mixture was then maintained in a water bath at 75° C. for thirty minutes for precuring. At the twenty-five minute mark, nanoclay suspension prepared according to the above paragraph, in amount by weight of SPC as set forth in Table 2 below, was added. At the end of the thirty minutes, the precured composition was cast on Teflon® coated glass plates and dried in an oven at 35° C. for about 16 hours and hot pressed on a Carver hydraulic hot press, model 3891-4PROA00 at 120° C. under a pressure of 7 MPa for 25 minutes.

Data on cured compositions obtained, is set forth in Table 2 below.

TABLE 2

| Clay (%) | Stress at max load (MPa) | Strain at max load (%) | Modulus (MPa) | Moisture content (%) |
|---|---|---|---|---|
| 0 | 8.0 | 28.6 | 84 | 22.0 |
| 1 | 8.6 | 30.0 | 92 | 20.6 |
| 3 | 10.0 | 27.2 | 132 | 20.4 |
| 5 | 12.3 | 23.5 | 180 | 20.0 |
| 7 | 12.5 | 20.3 | 239 | 19.6 |
| 10 | 14.2 | 16.4 | 328 | 19.5 |
| 15 | 16.7 | 11.0 | 589 | 18.0 |
| 20 | 17.2 | 9.4 | 725 | 18.0 |
| 30 | 20.2 | 6.0 | 1024 | 17.1 |

BIODEGRADABLE COMPOSITION PREPARATION EXAMPLE 2

SPC Plus MFC

SPC suspension was prepared as in Biodegradable Composition Preparation Example 1. Amounts of MFC, by weight of SPC as described in Table 3 below, were added into the homogenizing step prior to precuring. Precuring and curing were carried out as in Biodegradable Composition Preparation Example 1.

Data on cured compositions obtained is set forth in Table 3 below.

TABLE 3

| MFC Content (%) | Fracture Stress (MPa) | Fracture Strain (%) | Young's Modulus (MPa) | Toughness (MPa) | Moisture Content (%) |
|---|---|---|---|---|---|
| 0 | 32.2 | 11.5 | 961 | 2.8 | 14.2 |
| 10 | 45.8 | 12.2 | 1389 | 4.0 | 13.5 |
| 20 | 54.7 | 11.6 | 1727 | 5.0 | 12.7 |
| 30 | 65.2 | 12.0 | 1959 | 5.3 | 12.4 |
| 40 | 72.2 | 11.8 | 2146 | 5.5 | 12.0 |
| 50 | 77.9 | 11.2 | 2358 | 5.6 | 11.8 |

BIODEGRADABLE COMPOSITION PREPARATION EXAMPLE 3

SPC Plus Phytagel™

SPC solution was prepared as in Biodegradable Composition Preparation 1 but with 20% glycerol by weight of SPC at pH of 7. Varying amounts of Phytagel™ to provide percentages by weight of SPC as set forth in Table 4 below were dissolved in distilled water to form a solution or weak gel (depending on the concentration). The solution or gel was added to the initial SPC/glycerol solution during homogenizing. After homogenizing, precuring was carried out at 75° C. for thirty minutes. The precured admixture was cast onto Teflon® coated glass plates to form sheets. The precured sheets were dried and cured under the conditions set forth in Biodegradable Composition Preparation Example 1.

Data on cured compositions obtained, is set forth in Table 4 below.

TABLE 4

| Phytogel® content (%) | Stress at max load (MPa) | Strain at max load (%) | Modulus (MPa) | Moisture content (%) |
|---|---|---|---|---|
| 0 | 14.7 | 25.7 | 201 | 16.7 |
| 5 | 21.1 | 22.7 | 314 | 16.3 |
| 10 | 26.1 | 18.8 | 406 | 16.2 |
| 20 | 34.9 | 17.1 | 538 | 16.0 |
| 30 | 43.7 | 15.9 | 651 | 15.8 |
| 40 | 50.1 | 14.8 | 717 | 15.5 |
| 50 | 52.4 | 14.2 | 742 | 15.5 |

BIODEGRADABLE COMPOSITION PREPARATION EXAMPLE 4

SPC Plus Phytagel™ Plus Nanoclay

SPC solution (12.5% glycerol by weight of SPC, pH of 7) was prepared as described in Biodegradable Composition Preparation Example 3. Phytagel™ in distilled water to provide a 40% Phytagel™ level by weight of SPC was added as described in Biodegradable Composition Preparation Example 3, during homogenizing. Precuring was then initiated as in said Example 3. After twenty-five minutes of precuring, nanoclay slurry prepared as set forth in said Biodegradable Composition Preparation Example 1, was added to provide different nanoclay loadings as set forth in Table 5 below. Precuring was continued for five more minutes. Curing was then carried out as in said Example 1.

Data on cured compositions obtained is set forth in Table 5 below.

TABLE 5

| Clay (%) | Stress at max load (MPa) | Strain at max load (%) | Modulus (MPa) | Moisture content (%) |
|---|---|---|---|---|
| 0 | 66.2 | 10.0 | 1675 | 14.4 |
| 5 | 70.6 | 9.8 | 1983 | 14.4 |
| 7 | 72.5 | 9.5 | 2124 | 14.1 |
| 10 | 69.3 | 8.6 | 2248 | 13.9 |
| 15 | 69.6 | 8.6 | 2349 | 13.9 |
| 20 | 69.0 | 7.3 | 2515 | 13.7 |

BIODEGRADABLE COMPOSITION PREPARATION EXAMPLE 5

SPC Plus Agar

20% Glycerol, Variation in Agar Amount

SPC powder was suspended in distilled and deionized water in a weight ratio of 1:15. To the SPC suspension, 20% glycerol by weight of SPC, was added as a plasticizer. The pH was 7.0. Agar was dissolved in distilled and deionized water at 90° C. (heating being provided by a water bath) using a magnetic stirrer, to provide agar contents (by weight of SPC) as set forth in Table 6 below. The SPC suspension and agar solution were mixed and the admixture was precured using a water bath maintained at 90° C., for thirty minutes. The precured composition was poured onto Teflon®-coated glass plates and dried at 35° C. for twenty-four hours to obtain dried sheets. The dried sheets were cured using a hot press using a pressure of about 8 MPa at 120° C. for twenty-five minutes. The cured sheets were conditioned at 21° C. and 65% relative humidity (per ASTM Test No. D618) for three days prior to determining their properties.

Data on cured compositions obtained, is set forth in Table 6 below.

TABLE 6

| Agar (%) | Fracture Stress (MPa) | Fracture Strain (%) | Modulus (MPa) | Moisture (%) |
|---|---|---|---|---|
| 0 | 13.8 | 22.9 | 323 | 16.6 |
| 10 | 18.4 | 21.3 | 622 | 16.1 |
| 20 | 23.1 | 22.1 | 839 | 16.0 |
| 30 | 29.9 | 22.0 | 1099 | 15.5 |
| 40 | 36.1 | 21.6 | 1296 | 15.2 |
| 50 | 40.1 | 23.4 | 1522 | 15.0 |
| 60 | 41.0 | 24.0 | 1493 | 15.1 |

BIODEGRADABLE COMPOSITION PREPARATION EXAMPLE 6

SPC Plus Agar

10% Glycerol, Variation in Agar Content

Processing was carried out as in Biodegradable Composition Preparation Example 5 except that the glycerol content was 10% (by weight of SPC).

Data on cured composition is set forth in Table 7 below.

TABLE 7

| Agar (%) | Fracture Stress (MPa) | Fracture Strain (%) | Modulus (MPa) | Toughness (MPa) |
|---|---|---|---|---|
| 0 | 25.7 | 8.0 | 722 | 2.66 |
| 10 | 33.8 | 8.2 | 1081 | 2.89 |
| 20 | 41.0 | 8.8 | 1687 | 3.21 |
| 30 | 48.9 | 8.9 | 2037 | 3.98 |
| 40 | 53.9 | 8.1 | 2380 | 4.19 |
| 50 | 59.8 | 8.6 | 2633 | 4.56 |
| 60 | 56.4 | 7.9 | 2574 | 4.24 |

BIODEGRADABLE COMPOSITION PREPARATION EXAMPLE 7

SPC Plus Agar

50% Agar—Variation in Glycerol Content

Processing was carried out as in Biodegradable Composition Preparation Example 5 except that agar content was not varied but was fixed at 50% by weight and glycerol content was varied. The pH was 7.0.

Data on cured compositions obtained, is set forth in Table 8 below.

TABLE 8

| Glycerol (%) | Fracture Stress (MPa) | Fracture Strain (%) | Modulus (MPa) | Toughness (MPa) | Moisture (%) |
|---|---|---|---|---|---|
| 20 | 40.1 | 23.4 | 1522 | 8.48 | 15.0 |
| 15 | 46.1 | 15.9 | 2008 | 6.38 | 14.7 |
| 10 | 59.8 | 8.6 | 2633 | 4.56 | 14.4 |
| 5 | 69.9 | 6.1 | 3143 | 3.24 | 14.3 |
| 0 | 79.1 | 3.9 | 3443 | 1.93 | 14.4 |

BIODEGRADABLE COMPOSITION PREPARATION EXAMPLE 8

SPC Plus Agar

No Glycerol, Variations in Agar Content

Processing was carried out as in Biodegradable Composition Preparation Example 5 except that no glycerol was included and agar content was varied.

Data on cured compositions obtained, is set forth in Table 9 below.

TABLE 9

| Agar (%) | Fracture Stress (MPa) | Fracture Strain (%) | Modulus (MPa) | Moisture (%) |
|---|---|---|---|---|
| 20 | 63 | 3.1 | 3235 | 13.9 |
| 30 | 72 | 3.5 | 3306 | 14.2 |
| 40 | 77 | 3.7 | 3408 | 14.4 |
| 50 | 79 | 3.9 | 3443 | 14.4 |
| 60 | 81 | 4.0 | 3369 | 14.5 |

BIODEGRADABLE COMPOSITION PREPARATION EXAMPLE 9

SPC Plus Agar Plus Nanoclay

SPC powder was suspended in distilled and deionized water and 10% glycerol was added as a plasticizer. Agar in amount to provide 50% agar by weight of SPC was added to distilled and deionized water (combination maintained in a water bath kept at 90° C.). The SPC suspension and agar solution were mixed using a magnetic stirrer for fifteen minutes to obtain a uniform mix and the resulting admixture was precured using a water bath maintained at 90° C., for thirty minutes. After twenty-five minutes of the precuring, nanoclay slurry prepared as in Biodegradable Composition Preparation Example 1 was added to provide different nanoclay loadings as set forth in Table 10 below. Precuring was then continued for five more minutes. The precured compositions were poured onto Teflon®-coated glass plates and dried at 35° C. for twenty-four hours to obtain dried sheets. The dried sheets were cured using a hot press at 9 MPa and 120° C. for twenty-five minutes. The cured sheets were conditioned at 21° C. and 65% relative humidity (per ASTM Test No. D618) for three days prior to determining their properties.

Data on cured composition obtained, is set forth in Table 10 below.

TABLE 10

| Nano-clay (%) | Fracture Stress (MPa) | Fracture Strain (%) | Modulus (MPa) | Toughness (MPa) |
|---|---|---|---|---|
| 0 | 59.8 | 8.6 | 2633 | 4.56 |
| 3 | 66.5 | 6.7 | 2990 | 4.32 |
| 5 | 69.0 | 4.7 | 3266 | 3.61 |
| 7 | 71.1 | 3.9 | 3478 | 3.07 |
| 10 | 68.3 | 3.8 | 3565 | 2.73 |
| 15 | 66.0 | 3.7 | 3731 | 2.27 |

BIODEGRADABLE COMPOSITION PREPARATION EXAMPLE 10

SPC Plus Agar Plus MFC

SPC suspension and agar solution were mixed as in Biodegradable Composition Preparation Example 9 (50% agar by weight of SPC), except that no glycerol was included. Varying amounts of MFC by weight of SPC as described in Table 11 below were added and stirring was carried out for fifteen minutes. The mixture was precured in a water bath at 90° C. for thirty minutes. The precured composition was poured onto Teflon®-coated glass plates and dried at 35° C. for twenty-four hours to form sheets. The dried sheets were cured using a hot press at 8 MPa and 120° C. for twenty-five minutes. The cured sheets were conditioned at 21° C. and 65% relative humidity (per ASTM Test No. D618).

Data on cured composition obtained, is set forth in Table 11 below.

TABLE 11

| MFC (%) | Fracture Stress (MPa) | Fracture Strain (%) | Modulus (MPa) | Toughness (MPa) |
|---|---|---|---|---|
| 0 | 70 | 3.22 | 3463.91 | 1.08 |
| 10 | 77 | 3.46 | 3519.87 | 1.56 |
| 20 | 80 | 3.96 | 3624.58 | 1.78 |
| 30 | 83 | 3.75 | 3963.68 | 2.52 |

TABLE 11-continued

| MFC (%) | Fracture Stress (MPa) | Fracture Strain (%) | Modulus (MPa) | Toughness (MPa) |
|---|---|---|---|---|
| 40 | 82 | 3.63 | 4151.81 | 2.97 |
| 50 | 87 | 4.21 | 3993.94 | 2.86 |

It is noted that the fracture strains were between 3% and 4% because no plasticizer was included. Inclusion of plasticizer causes increase in fracture strain and toughness values but causes decrease in strength and modulus values.

BIODEGRADABLE COMPOSITION PREPARATION EXAMPLE 11

SPI or SF Plus Strengthening Agent

Equal amounts of SPI and/or SF can be substituted in Biodegradable Composition Preparation Examples 1-10 to produce strengthened cured soy proteins with good mechanical properties (i.e., improved compared to cured soy protein without the strengthening agent).

FABRICATION EXAMPLE 1

Randomly Oriented Short Fibers

Short cellulose fibers are blended into the admixture of SPC suspension (containing glycerol) and agar solution, admixture of Biodegradable Composition Preparation Example 5 (to provide 10% glycerol by weight of SPC and 50% agar by weight of SPC) in an amount of 30% fibers by weight of SPC, to provide uniform distribution of randomly oriented fibers. Precuring is then carried out by mixing to maintain uniform distribution and random orientation while maintaining the composition in a water bath at 90° C. for thirty minutes. The precured admixture is then dried at 35° C. for twenty-four hours so as to maintain the uniform distribution and random orientation of the fibers. The precured blend is poured onto a non-stick surface to form sheets and the sheets are dried at 35° C. for twenty-four hours and then cured by hot pressing at 8 MPa at 120° C. for twenty-five minutes.

In another case, a plurality of dried sheets are stacked and the stack is hot pressed.

FABRICATION EXAMPLE 2

Unidirectional Short Fibers

The method of this example is shown in FIG. 1.

As shown in FIG. 1, short fibers are dispensed onto pleats of a pleated Teflon® coated cardboard or plastic or metal sheet material substrate plate to form rows of aligned unidirectional short fibers, with one row in each pleat. The fibers in each pleat are fed as rows of unidirectional fibers on a sheet of resin mixture of SPC suspension in water (10% glycerol by weight of SPC) and agar solution in water (to provide 50% agar by weight of SPC). The sheet of resin with rows of unidirectional fibers thereon/therein is precured at 90° C. for thirty minutes, then dried at 35° C. for twenty-four hours, then cured by hot pressing at 8 MPa and 120° C. for twenty-five minutes.

FABRICATION EXAMPLE 3

Impregnated Parallel Arrays of Yarn

Parallel arrays of yarns constituted of flax material or other green yarns or filaments or individual sections of such parallel arrays are impregnated with biodegradable composition of the invention hereto.

Figure 2A:
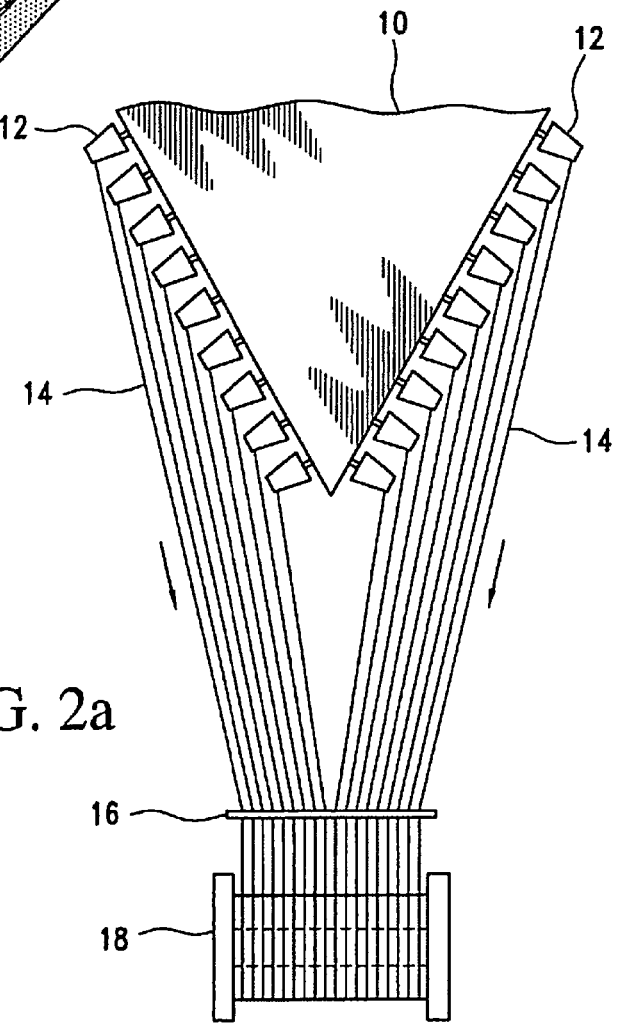
FIG. 2a is a schematic diagram showing a warping procedure in preparation for coating/impregnation herein.

FIG. 2a depicts warping procedure for preparing a single parallel array.

As shown in FIG. 2a, apparatus and process for preparing a single array comprise, a creel 10 supporting individual yarn packages or bobbins 12 for feeding yarns 14 over a guide 16 to a warping beam 18 where the yarns are then collected in parallel array.

Figure 2B:
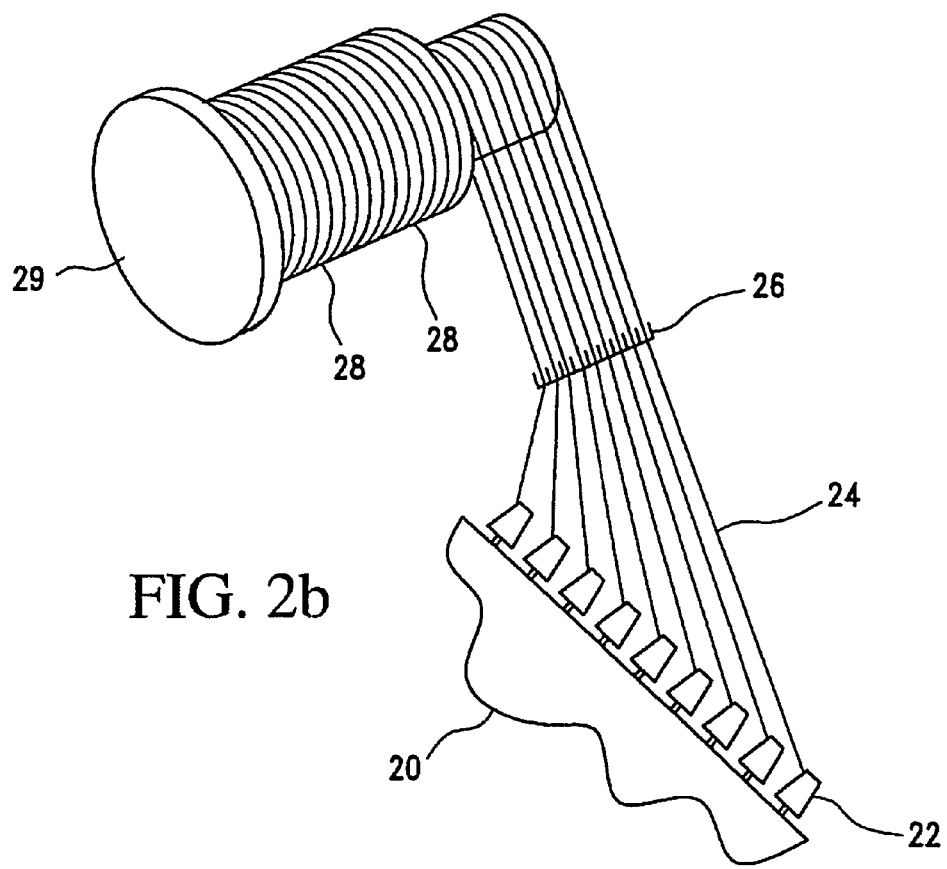
FIG. 2b is a schematic diagram showing a sectional warping in preparation for impregnation/coating herein.

As shown in FIG. 2b, apparatus and process for preparing sections of parallel array yarns comprise a creel 20 supporting individual yarn packages 22, feeding yarns 24, over a comb 26 to form sections of parallel array yarns 28 on sectional beam 30.

The impregnation herein is carried out on the parallel yarn arrays downstream of the guide 16 or comb 26 and upstream of beams 18 and 29.

Figure 3:
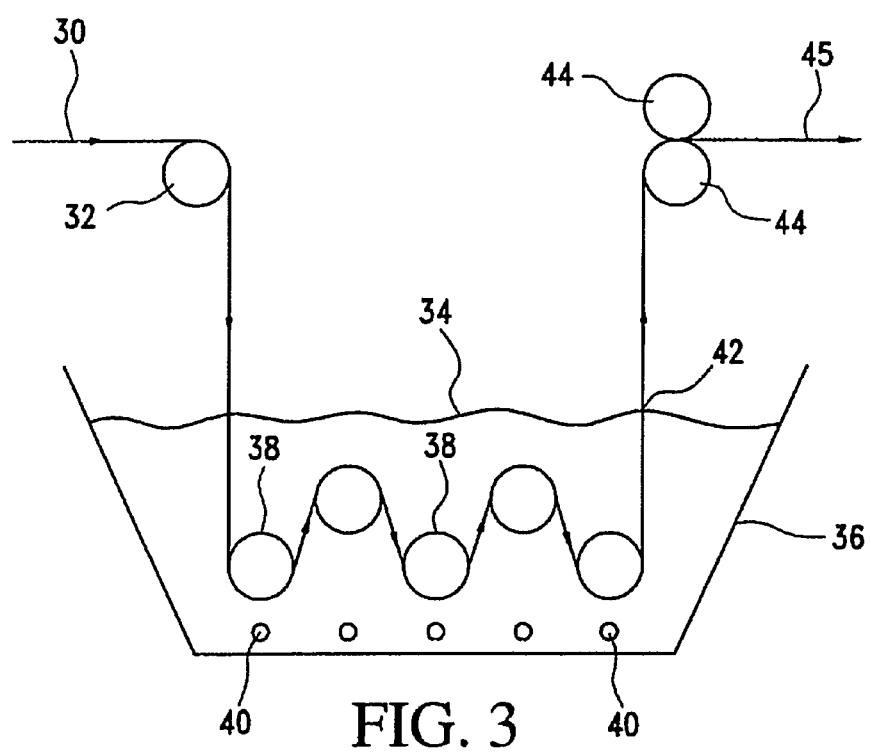
FIG. 3 is a schematic diagram showing a resin impregnation technique according to the present invention.
Figure 4A:
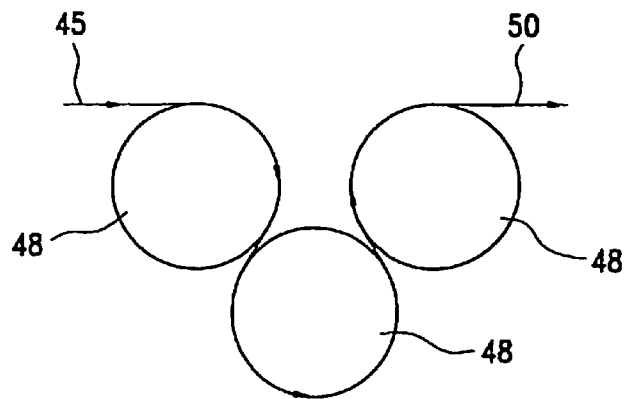
FIGS. 4a and 4b are schematic diagrams showing techniques for drying according to the present invention.
Figure 4B:
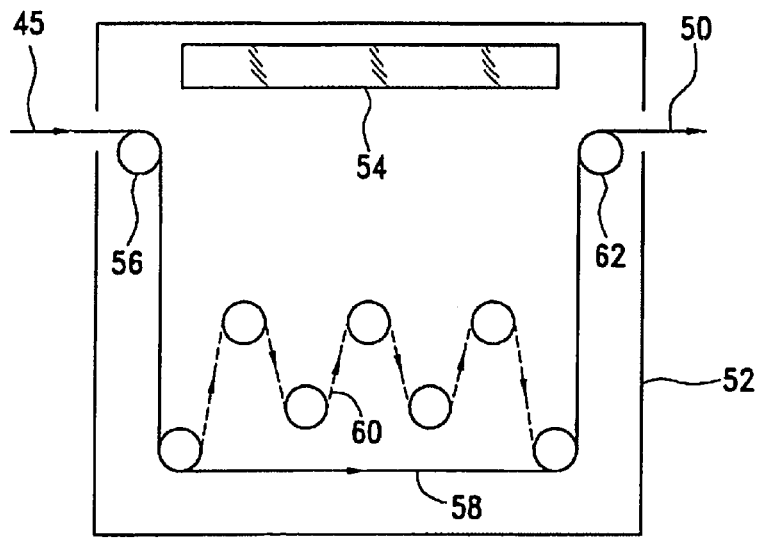
Figure 5:
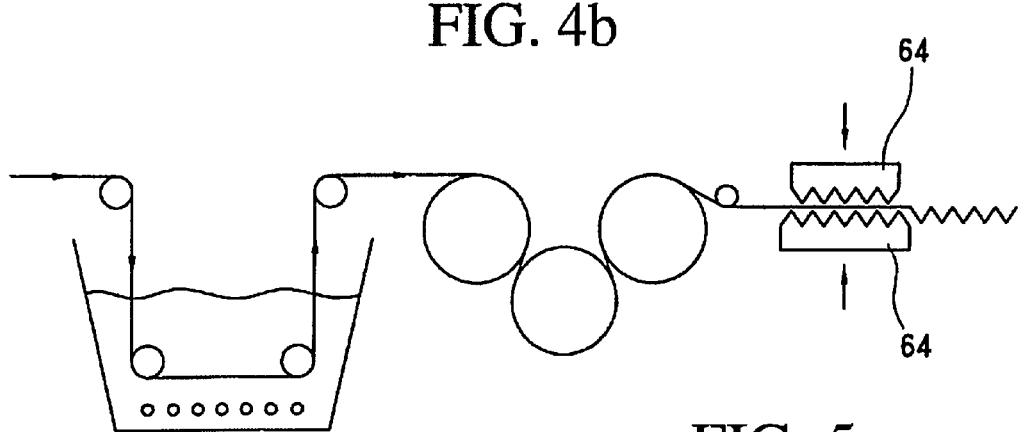
FIG. 5 is a schematic diagram showing a continuous manufacturing process of a green composite according to the present invention.

FIG. 3 depicts resin impregnation according to the invention on the yarn parallel arrays. As shown in FIG. 3, parallel arrays 30 (alternately woven or non-woven fabric) are fed over a guide roller 32 into a bath 34 of precuring resin in a container (resin bath) 36. The bath contains an admixture of SPC suspension in water containing 10% glycerol by weight of SPC and agar solution in water, to provide 50% by weight agar by weight of SPC. The parallel arrays 30 pass through bath 34 via immersion rollers 38. The impregnating apparatus constituted of container 36 holding bath 34 contains below the level of the bath 34 heating elements 40 to provide precured resin toward the outlet side. The parallel arrays are coated/impregnated in bath 34 with precured resin bath and leave the bath as parallel arrays coated with precured resin at 42 and then are passed through the nip of squeeze rolls 44 to remove excess precured resin whereupon the coated/impregnated parallel arrays 45 are then passed to drying, with method/apparatus for this schematically depicted in FIG. 4a and 4b. FIG. 4a depicts drying cylinders 48 in series and entering coated parallel array is shown at 45 and exiting dried coated parallel array is shown at 50. FIG. 4b schematically depicts an alternative method and apparatus for drying. As shown in FIG. 4b, a drier contains a microwave or infrared source 54 and parallel array coated with precured resin passes over guide roller 56 and via path 58 or path 60 (for more residence time), leaving via exit guide roller 62 as dried coated parallel array as shown at 50. The dried precured resin coated parallel arrays are then subjected to resin curing treatment. FIG. 5 shows the dip coating process/apparatus of FIG. 3, followed by the drying process/apparatus of FIG. 4a, followed by curing. The curing is carried out by hot pressing dies 64.

Parallel arrays of green fibers, or green filaments, or green fabric (woven, knitted or non-woven) can be substituted for the parallel arrays of yarn above, to produce composites with cured coating coated thereon and/or impregnated therein.

FABRICATION EXAMPLE 4

Composites

This example shows three kinds of composites which can be fabricated herein.

Figure 6A:
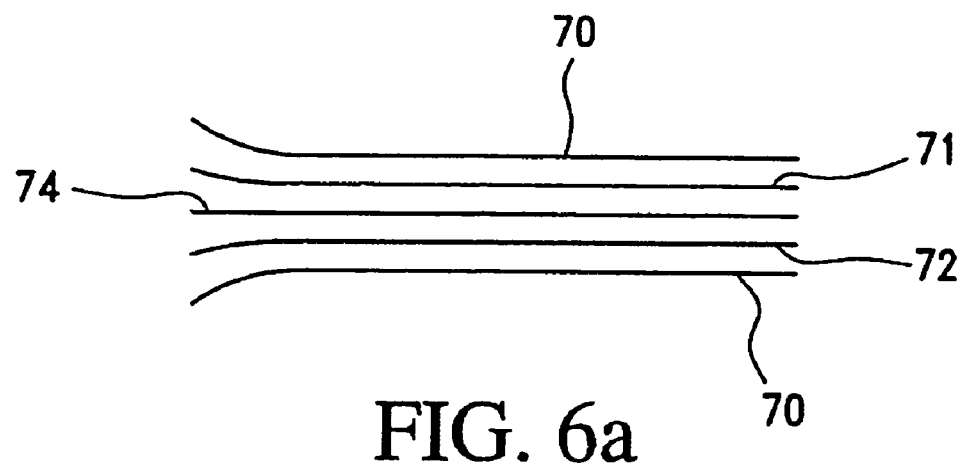
FIG. 6a is a schematic diagram showing a multilayered green composite with a hydrophobic sheath according to the present invention.

FIG. 6a shows a multilayered green composite with polylactic acid/polyhydroxybutyrate sheath layers 70 as outside layers of a composite with interior mat based laminates 72 and a central yarn based laminate 74. The layer 72 and 74 are coated impregnated with cured resin according to the invention. The curing (e.g., hot pressing) can be carried out after the layers are stacked.

Figure 6B:
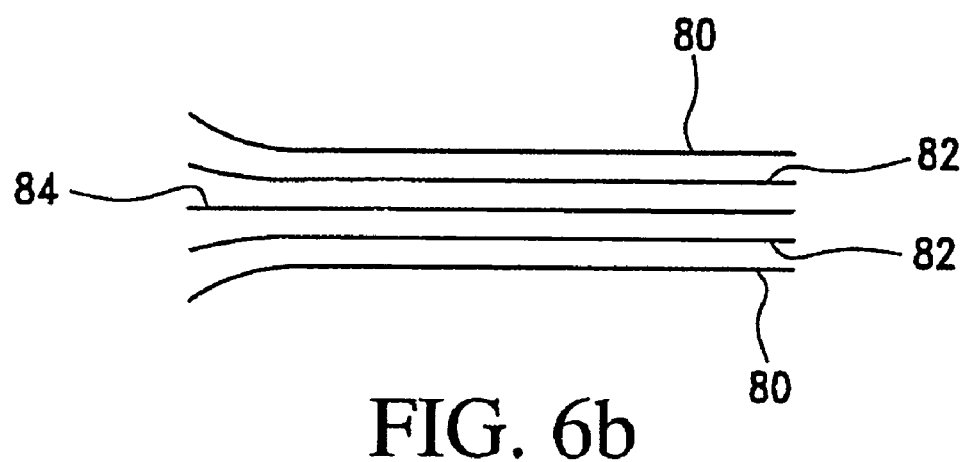
FIG. 6b is a schematic diagram showing a multilayered green composite comprising a fabric based laminate according to the present invention.

FIG. 6b shows a multilayered green composite with outer fabric base laminates 80, inner non-woven mat composite based laminates 82 adjacent inner side of each layer 80 and a central fiber based laminate 84 where all of the layers contain resin herein. The resin may be cured in a stack of all the layers at once.

Figure 6C:
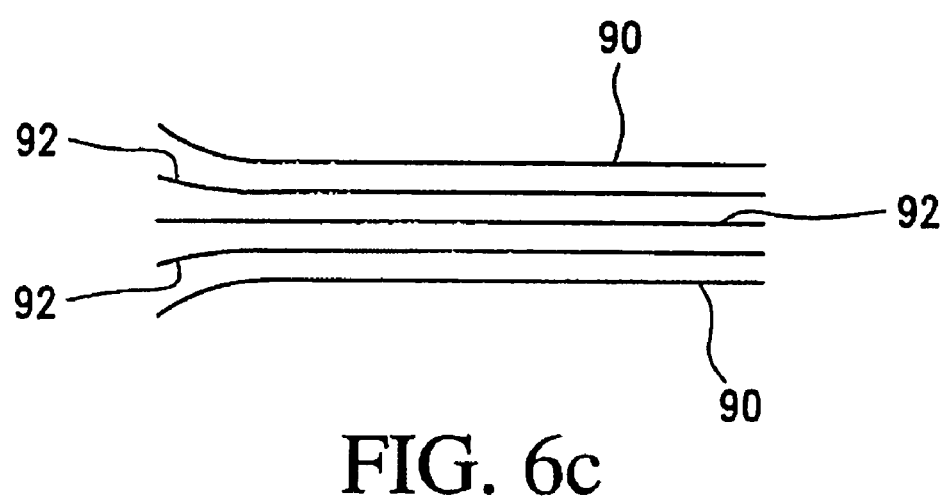
FIG. 6c is a schematic diagram showing a multilayered green composite comprising green laminates and a metal sheath according to the present invention.

FIG. 6c depicts a hybrid metal layer green layer composite containing outer metal sheath layers 90 and green resin laminates 92 of the invention herein. The metal sheath protects the green layers from water. The composite can be used in applications at low temperature where metals are currently used. The green portion reduces the total weight compared to all metal corresponding items. At the end of the functional life of the composite, the metal sheath can be peeled and the metal recycled and the green portion can be degraded.

In examples the term resin is used to mean biodegradable composition herein prior to curing and cured resin refers to the same after curing.

Variations

The foregoing description of the invention has been presented describing certain operable and preferred embodiments. It is not intended that the invention should be so limited since variations and modifications thereof will be obvious to those skilled in the art, all of which are within the spirit and scope of the invention.

What is claimed is:

1. A cured, biodegradable composition comprising: from 99.5% to 40% by weight soy protein (soy protein plus green strengthening agent weight basis) and from 0.5 to 60% by weight (soy protein plus green strengthening agent weight basis) of one or more polysaccharide green strengthening agents selected from the group consisting of agar, gellan and mixtures thereof, said composition having a stress at maximum load of at least 12.3 MPa and modulus of at least 150 MPa, wherein the composition is cured.

2. The biodegradable composition of claim 1 further comprising a nanoclay.

3. The biodegradable composition of claim 1 further comprising microfibrillated cellulose.

4. The biodegradable composition of claim 1 further comprising nanofibrillated cellulose.

5. The biodegradable composition of claim 1 further comprising additional strengthening agents selected from the group consisting of green reinforcing fibers, green reinforcing filaments or green reinforcing yarns and/or green reinforcing woven or knitted fabric or non-woven fabric and combinations thereof.

6. The biodegradable composition of claim 1 comprising from 98 to 40% by weight (soy protein plus green strengthening agent basis)-array of soy protein, from 2 to 60% by weight (soy protein) plus green strengthening agent basis) of polysaccharide green strengthening agent, the composition having a fracture stress of at least 15 MPa and a modulus of at least 500 MPa.

7. A cured, biodegradable composition comprising from 98 to 40% by weight (soy protein plus green strengthening agent dry weight basis) soy protein and from 2 to 60% by weight of green strengthening agent (soy protein plus green strengthening agent dry weight basis) wherein the green strengthening agent comprises from 1 to 59% by weight green polysaccharide (soy protein plus green polysaccharide plus nanoclay dry weight basis) and from 1 to 15% by weight nanoclay (soy protein plus polysaccharide plus nanoclay dry weight basis), wherein the composition is cured.

8. A cured biodegradable composition comprising from 98 to 40% by weight (soy protein plus green strengthening agent dry weight basis) soy protein and from 2 to 60% by weight of green strengthening agent (soy protein plus green strengthening agent dry weight basis) wherein the green strengthening agent comprises from 1 to 59% by weight polysaccharide selected from the group consisting of gellan, agar or combinations thereof (soy protein plus polysaccharide plus microfibrillated or nanofibrillated cellulose dry weight basis) and from 1 to 59% by weight microfibrillated cellulose or nanofibrillated cellulose or a mixture thereof (soy protein plus polysaccharide plus microfibrillated or nanofibrillated cellulose dry weight basis), wherein the composition is cured.

9. A cured, biodegradable composition comprising from 98 to 40% by weight (soy protein plus green polysaccharide dry weight basis)-array of soy protein, and from 2 to 60% by weight (soy protein plus green polysaccharide dry weight basis) of green polysaccharide selected from the group consisting of gellan, agar and combinations thereof, wherein the composition is cured.

\* \* \* \* \*